United States Patent
Hickey et al.

(10) Patent No.: US 11,934,362 B2
(45) Date of Patent: Mar. 19, 2024

(54) GRANULAR DATA MIGRATION

(71) Applicant: EMC IP Holding Company LLC

(72) Inventors: Charles J. Hickey, Aptos, CA (US); Murthy V. Mamidi, San Jose, CA (US); Neerajkumar Chourasia, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 83 days.

(21) Appl. No.: 17/382,344

(22) Filed: Jul. 22, 2021

(65) Prior Publication Data

US 2023/0027487 A1 Jan. 26, 2023

(51) Int. Cl.
| | |
|---|---|
| G06F 16/21 | (2019.01) |
| G06F 16/22 | (2019.01) |
| G06F 16/23 | (2019.01) |
| G06F 16/2457 | (2019.01) |
| G06F 16/28 | (2019.01) |

(52) U.S. Cl.
CPC ........ *G06F 16/214* (2019.01); *G06F 16/2246* (2019.01); *G06F 16/2358* (2019.01); *G06F 16/24573* (2019.01); *G06F 16/288* (2019.01)

(58) Field of Classification Search
CPC ............. G06F 16/214; G06F 16/24573; G06F 16/2246; G06F 16/288; G06F 16/2358
See application file for complete search history.

(56) References Cited

U.S. PATENT DOCUMENTS

| | | | | |
|---|---|---|---|---|
| 8,966,283 | B1* | 2/2015 | Shankar | G06F 21/602 |
| | | | | 713/193 |
| 9,898,369 | B1* | 2/2018 | Moghe | G06F 16/128 |
| 10,496,611 | B1* | 12/2019 | Singh | G06F 16/11 |
| 10,877,931 | B1* | 12/2020 | Nadiminti | G06F 16/1787 |
| 11,392,541 | B2* | 7/2022 | Bhattacharya | G06F 16/9027 |
| 2009/0132566 | A1* | 5/2009 | Ochi | G06F 40/137 |
| 2013/0054530 | A1* | 2/2013 | Baker | G06F 16/119 |
| | | | | 707/639 |
| 2013/0290375 | A1* | 10/2013 | Anderson | G06F 16/2343 |
| | | | | 707/E17.012 |
| 2017/0149886 | A1* | 5/2017 | Shetty | G06F 3/065 |
| 2017/0300247 | A1* | 10/2017 | Dewey | G06F 3/0665 |
| 2019/0179782 | A1* | 6/2019 | Hogan | G06F 13/20 |
| 2020/0097459 | A1* | 3/2020 | Baird, III | G06F 16/2471 |

(Continued)

*Primary Examiner* — Brittany N Allen
*Assistant Examiner* — William P Bartlett
(74) *Attorney, Agent, or Firm* — Staniford Tomita LLP

(57) ABSTRACT

Embodiments for enabling granular migration of data with high efficiency. A defined metadata element, a tag, is assigned to each file, and then tag filtering is used to direct the data to the proper location. Files with different tags can be selected for transfer, and such a group of tags is referred to as a tag set. Embodiments can be used with a defined backup system file migration process, such as present in the Data Domain File System. By using snapshots, incoming new data (ingested file) is allowed to continue while the migration is in process and maintaining data consistency at the same time. This is achieved by performing operations on B+ Tree snapshots in conjunction with tag filtering on keys present in the leaf pages of these structures. This method is efficient became it makes a single pass walk of a B+ Tree in contrast with previous methods that look up files one-by-one via their pathname.

12 Claims, 12 Drawing Sheets

(56) References Cited

U.S. PATENT DOCUMENTS

2020/0133719 A1\* 4/2020 Chinthekindi ........ G06F 3/0644
2020/0233840 A1\* 7/2020 Chakankar ............ G06F 3/0647
2020/0250232 A1\* 8/2020 Bhattacharya ...... G06F 16/9027
2020/0301882 A1\* 9/2020 Pogde ................ G06F 11/1464

\* cited by examiner

FIG. 6

| KEY TYPE | VALUE | COMMENT | TAGGING IMPLICATION | MIGRATE |
|---|---|---|---|---|
| CHILD | 0X01 | Used for Inodes Use Child for LSB of lkey | For files - contains tag For dir Tag not used | Yes |
| BLINK | 0x03 | Back links to directories Use Child for LSB of lkey | key format is <back-link-child>:<dirent-id>. Parent dir ID is in payload Blinks will get scattered close to the origin | Yes |
| OPAQUE | 0x07 | Used for Opaque Data (FM, etc.) | MTree parameters are in Opaque as are tags which can be ignored. Mrepl uses opaques. Snapshot ID is encoded in parent of key | Yes |
| ANNOTATION | 0x09 | Use child for LSB of lkey | Unused | No |
| ATTRIBUTE_NOREPL | 0x08 | | By definition not replicated | No |
| ATTRIBUTE_REPL | 0x0D | | | Yes |
| CHILD_INDIRECT | 0x0F | Segment Tree of file resides outside active tier | Same as Child. Used for LTR cloud | Yes |
| SD | 0x04 | Security descriptor. Use hash for LSB of lkey | Like hash. Hash will be nex/near CS HASH for file. Can convert to attribute and send | Yes |
| CS_HASH | 0x06 | Case sensitive hash. Use hash for LSB of lkey | Recreate on destination | No |
| CI_HASH | 0x08 | Use hash for LSB of lkey | Recreate on destination | No |

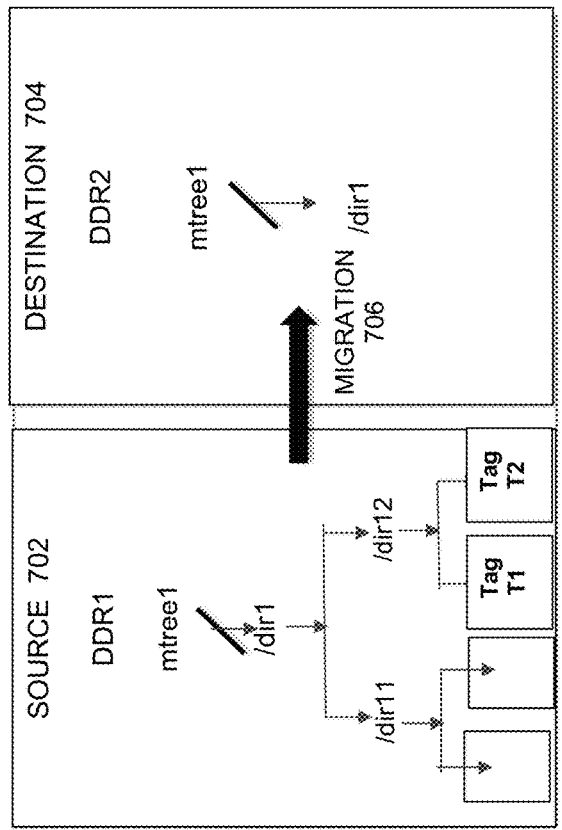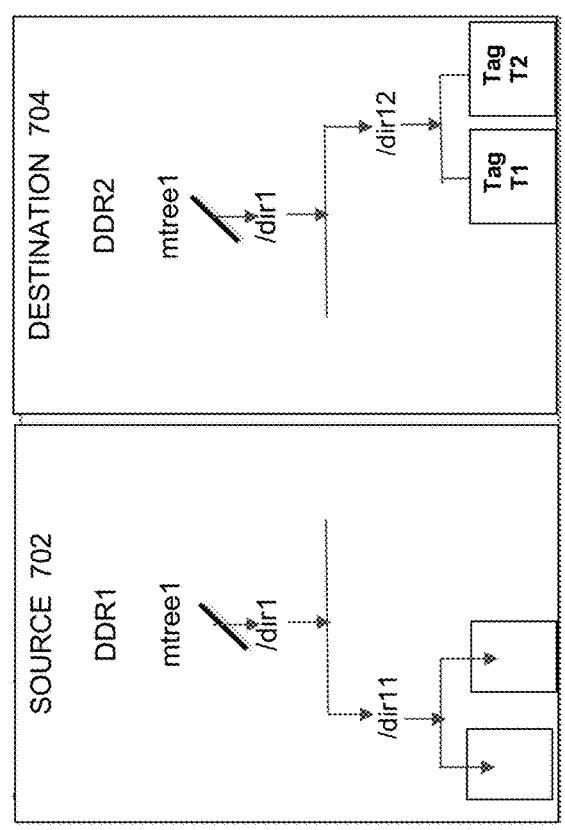

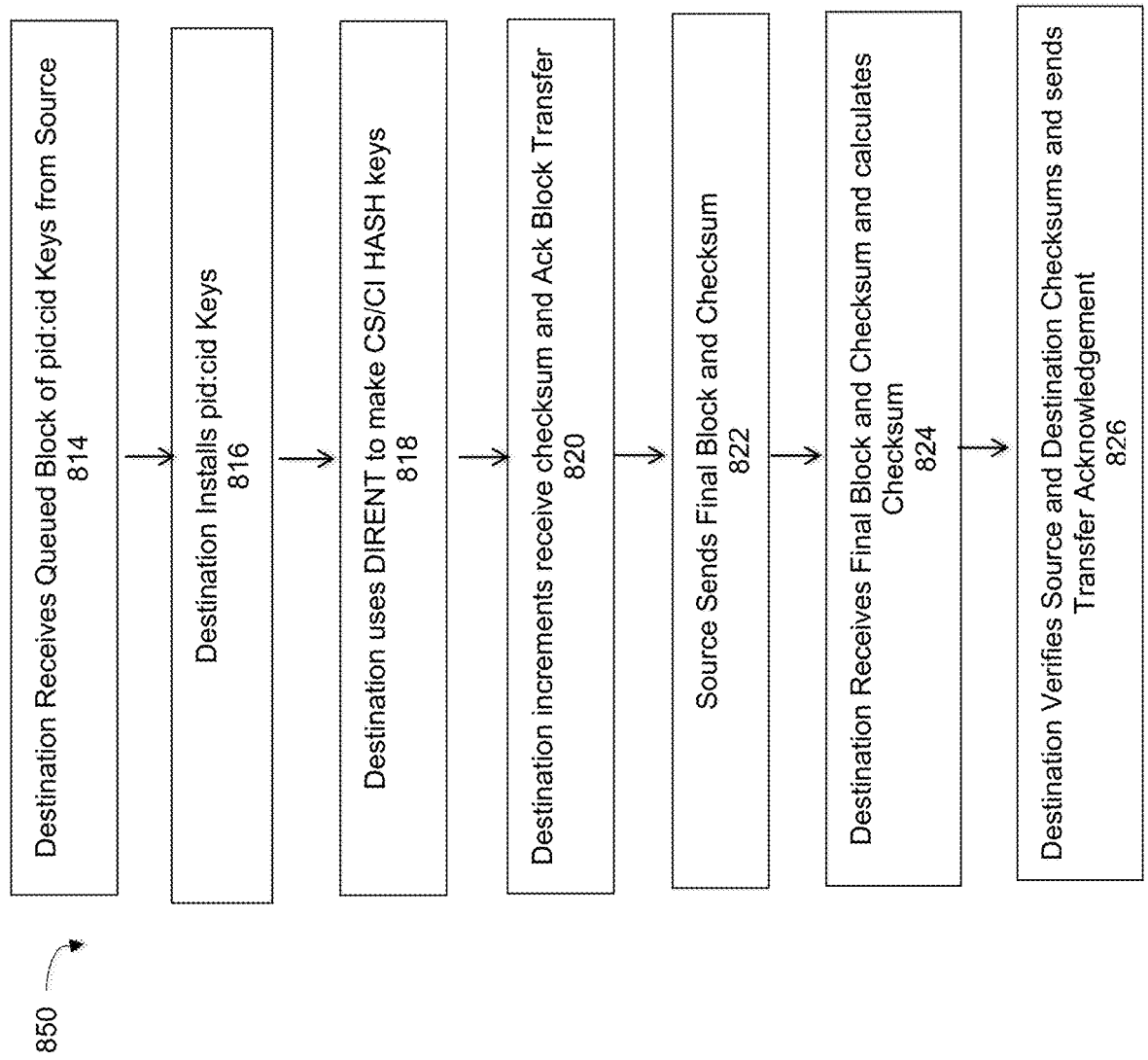

GRANULAR DATA MIGRATION

TECHNICAL FIELD

Embodiments are generally directed to cloud storage systems and data centers, and specifically to migrating files with sub-directory level granularity with high efficiency.

BACKGROUND

Modern data centers can have hundreds of compute and storage resources with some local and some in the cloud. Maximizing the efficient use of these resources requires moving data between storage appliances for load balancing and data protection purposes. Performing data movements on a per-file basis is slow, but has the advantage of being a fine grained operation, i.e., at the individual file level. Throughput of the per-file data movement process can be increased by moving an entire filesystem in bulk. However, these objects are often on the scale of terabytes in size, and their movement can be a disruptive process. This is complicated by the need to move data that is being concurrently modified. The problem is that there is no way to have the fine grained (or 'high granularity') control of per-file transfers, along with the performance of bulk filesystem transfers with the levels of consistency and efficiency required in modern data systems.

What is needed, therefore, is a system and method of migrating or moving files in as efficient manner as possible with a high level of granularity of the data, such as on the sub-directory level.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell, EMC, Networker, Data Domain, and Data Domain Boost are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 6 is a table that illustrates an example of list of tags and associated properties used in a granular migration process, under some embodiments.

FIGS. 7A and 7B illustrate symmetric migration of data at the sub-directory level in an example embodiment.

FIG. 8B is a flowchart illustrating a subsequent portion of the method of FIG. 8A.

DETAILED DESCRIPTION

Figure 1:
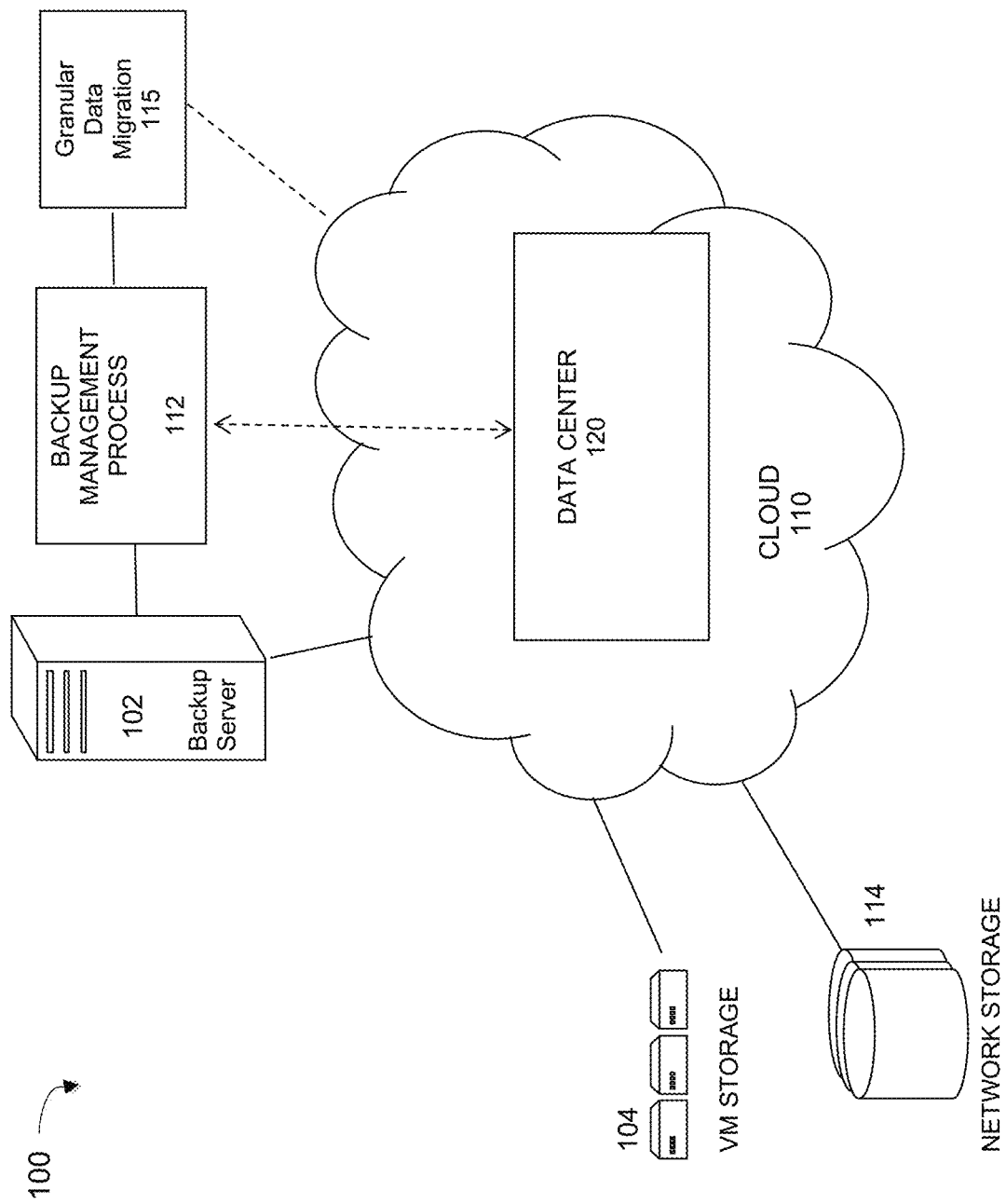
FIG. 1 illustrates a computer network that implements a granular data migration process for a distributed name space, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus, or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

FIG. 1 illustrates a computer network system implements embodiments of a granular data migration process, under some embodiments. System 100 comprises a large-scale network that includes a number of different devices, such as server or client computers 102, data center 120, storage devices 114, and other similar devices or computing resources. Other networks, sub-networks, and components may be included in system 100 including local area network (LAN) or cloud networks 110 and virtual machine (VM) storage 104 or VM clusters. These devices and network resources may be connected to a central network, such as a central or cloud computing network 110 that itself contains a number of different computing resources (e.g., computers, interface devices, and so on). FIG. 1 is intended to be an example of a representative system implementing a typical data center system under some embodiments, and many other topographies and combinations of network elements are also possible.

For the example network environment 100 of FIG. 1, server 102 is a backup server that executes a backup management process 112 that coordinates or manages the backup of data from one or more data sources, such as other servers/clients to storage devices, such as network storage 114 and/or virtual storage devices 104, or other data centers. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114. Backup targets or appliances may also be included in a data center 120 hosted in its own network (e.g., cloud) 110. Data center 120 may represent the computing resources running the information technology (IT) system of an organization or enterprise, and which are organized an interconnected in their own network, such as cloud 110. Typical data centers are relatively large-scale facilities that may be distributed around the world, but embodiments are not so limited. Any appropriate scale of intra- and inter-networked computers may be used, such as data centers within a state or region, municipality, or organization (e.g., corporation, school, University, hospital, etc.).

The network or networks of system 100 generally provide connectivity to the various systems, components, and may be implemented using protocols such as Transmission Control Protocol (TCP) and/or Internet Protocol (IP), well known in the relevant arts. In a cloud computing environment, the applications, servers, and data are maintained and provided through a centralized cloud computing platform. In an embodiment, parts of system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process 112. Thus, backup process 112 causes or facilitates the backup of this data to the storage devices of the network, such as network storage 114, which may at least be partially implemented through storage device arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system within a data center comprising a server or servers and other clients, and the data may reside on one or more hard drives (e.g., 114) for the database(s) in a variety of formats. The backup server 102 may be a server running Networker or Avamar data protection software backing up to Data Domain protection storage, such as provided by Dell/EMC™ Corporation. However, other similar backup and storage systems are also possible.

As stated above, for the embodiment of system 100, server 102 is a backup server that executes a deduplication backup process. The deduplication backup process may also be run partially or wholly within a VM, instead or as well. Network server 102 may also be a server computer that supports part or all of the hypervisor functions. In an embodiment, the virtual machines that use or are used as part of the deduplication backup process are implemented as part of a Data Domain (DD) system, though embodiments are not so limited. Data Domain systems present a single filesystem across all storage to enable ease-of-use and simple management. This single filesystem can be completely or partially exposed as CIFS shares (for Windows), NFS mount points (for Unix/Linux), VTL for open systems and IBMi and/or through advanced integration with Data Domain Boost (for Dell/EMC Avamar, Dell/EMC Networker, Dell/EMC Greenplum, Veritas NetBackup, Veritas Backup Exec, Oracle RMAN and Quest vRanger, and other similar programs).

In a deduplication backup system utilizing virtual machines (VMs), each VM runs its own file system, such as a Data Domain Restorer (DDR) or Data Domain File System (DDFS) by Dell/EMC Corp., along with other possible applications. In the DDFS (or similar) file system, protocol-specific namespaces are presented to clients/applications for accessing the logical file system layer. Some example protocol namespaces include: Data Domain Virtual Tape Library, Data Domain Boost storage units, and CIFS/NFS fileshares.

In an embodiment, files and directories for each namespace in system 100 are stored in a B+ Tree, or other similar self-balancing tree structure. Associated with the backup management process 112 is a granular data migration process 115 that may be embodied as a process that is included with or accessible from the backup management server and backup program 112, or as a cloud-based 110 program. Although embodiments are described with reference to B+ Trees, embodiments are not so limited, and other similar data structures or binary trees to B+ Trees may be used, such as MTrees, and the like. A B+ Tree is a variant of a standard B Tree in which copies of keys are stored in the internal node, the keys and records are stored in leaves, and a leaf node may include a pointer to the next leaf to speed sequential access.

For the file system used in system 100, a binary tree is used to store the namespace of the file system in persistent storage. In general, a B+ tree is a self-balancing tree data structure that maintains sorted data and allows searches, sequential access, insertions, and deletions in logarithmic time. B+ Trees are well suited for block-based storage systems that read and write relatively large blocks of data and are used in filesystems to allow quick random access to an arbitrary block in a particular file. In a B+ Tree, a search starts from the root and recursively traverses down. For every visited non-leaf node, if the node has the key (k), it simply returns the node. Otherwise, it recurs down to the appropriate child of the node. If it reaches a leaf node and does not find k in the leaf node, it returns a NULL value. A traversal operation starts from the leftmost child, and recursively prints the leftmost child, then repeats the same process for the remaining children and keys until it ultimately recursively prints the rightmost child.

An inode (index node) is a file system data structure that describes an object, such as a file or directory. Each inode stores the attributes and disk block locations of the object's data. File-system object attributes may include metadata that encodes information such as time of last change, access, modification, owner, permission data, and so on. Directories are lists of names assigned to inodes. A directory contains an entry for itself, its parent, and each of its children.

In systems using B+ Trees, it is necessary to co-locate all the files of a given directory in the same region in the persistent store to support efficient directory listing retrievals. By doing so, the file system will be able to retrieve the directory listing of files in a directory by reading as little portion of the storage as possible, while returning the maximum amount of file system name space with fastest possible time. One mechanism is to use a B+ Tree key structure composed of the parent directory inode as the primary key and child file inode as the secondary key to construct the full key. By virtue of B+ Tree key properties, all the child file inodes are stored in a cluster in a given storage region, thus allowing the file system to retrieve the directory listing of files in a directory by reading as small a storage portion as possible, while returning the maximum amount of file system name space with fastest possible time.

Each file inode is thus stored in the B+ Tree as a data blob using the parent directory inode number and the child file inode number as the key. Such a data structure may be denoted: "<parent_inode:child_inode>". This key is used to create a file handle that is exposed to client devices. For data integrity, it is important that file handles remain immutable so that files can always be located during their lifetimes.

For the example embodiment of FIG. 1, the data storage system is a Data Domain system. In the Data Domain Operating System filesystem, protocol-specific namespaces are presented to clients/applications for accessing the logical filesystem layer. The files and directories in each B+ Tree all reference the same pool of unique segments, called a collection, which is made up of log-structured containers that organize the segments on disk to optimize throughput and deduplication effectiveness. Within a Data Domain system, there are several levels of logical data abstraction above the physical disk storage.

Figure 2:
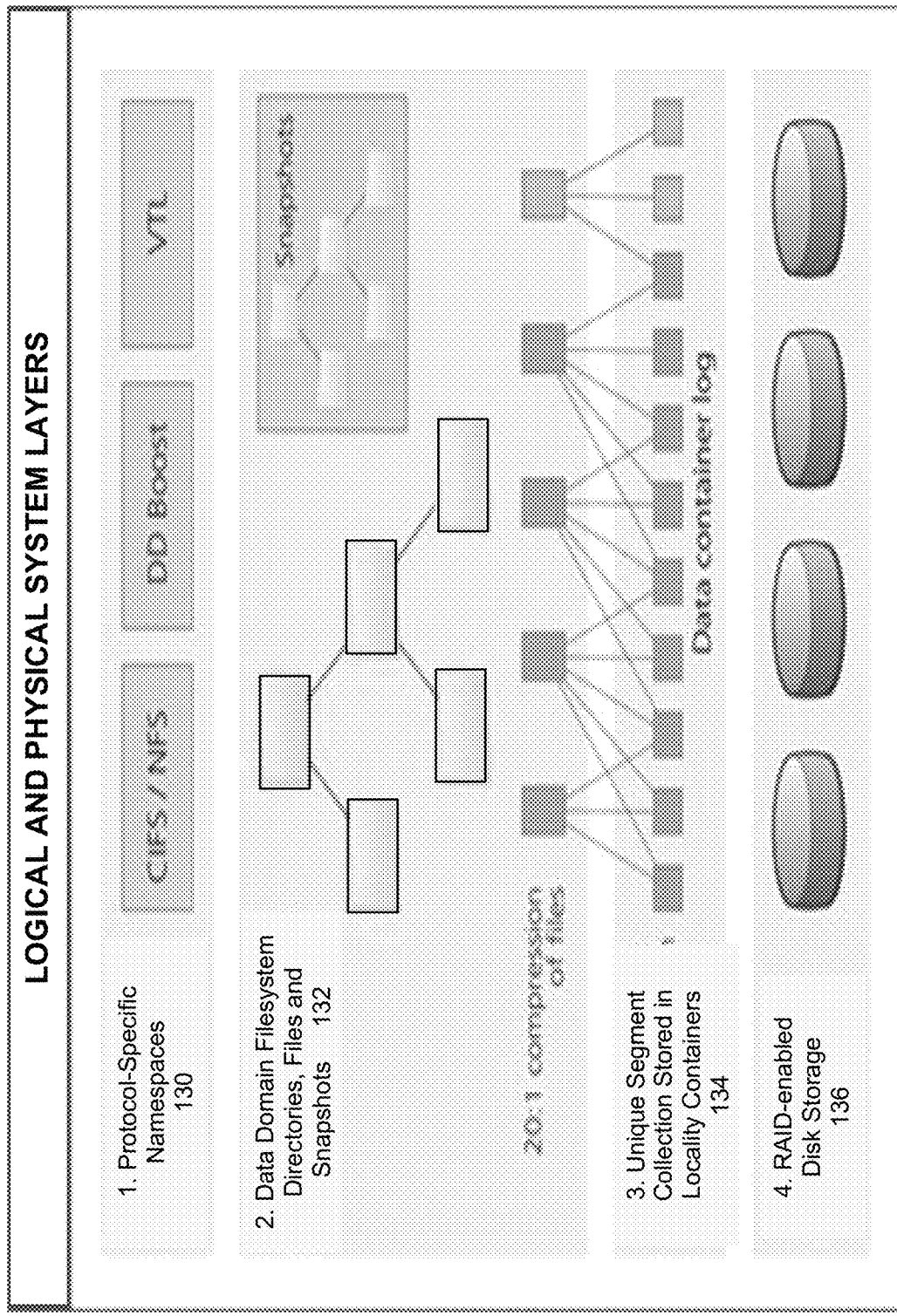
FIG. 2 levels of data abstraction in a Data Domain system including MTrees that implement a granular data migration process, under some embodiments.

FIG. 2 illustrates levels of data abstraction in a Data Domain system including tree-based data structures that implement snapshot backups for a granular data migration process, under some embodiments. As shown in FIG. 2, the Data Domain Operating System (DDOS) filesystem comprises protocol-specific namespaces 130 that provide an external interface to applications, such as CIFS/NFS file shares (over Ethernet), virtual tape libraries (VTL) (over Fibre Channel) and DD Boost storage units (SUs). A Data Domain deployment may use any combination of these simultaneously to store and access data. The filesystem B+ Trees, directories, files and snapshots layer 132 contain the files and directories for each namespace that are stored in B+ Trees in the DDOS filesystem. The snapshots in DDOS are logical and very space-efficient because they share the same underlying data segments. A unique segment collection 134 is stored in locality containers. The system identifies and eliminates duplicate segments within each container and then writes compressed deduplicated segments to physical disk. The RAID-enabled disk storage layer 136 comprises a collection containers layer over RAID enabled disk drive blocks to ensure data security and integrity.

The Data Domain File System (DDFS) supports manageable file sets called MTrees.

In general, an MTree is a tree data structure similar to a B+ Tree (or R-tree), which is constructed using a metric and relies on triangle inequality for efficient range and k-nearest neighbor queries. As with other tree-based data structures, the MTree is composed of nodes and leaves. In each node there is a data object that identifies it uniquely and a pointer to a sub-tree where its children reside. Every leaf has several data objects.

An MTree is a self-contained file set and each MTree acts as a mount point for the file system. DDFS implements the persistence of the name space of an MTree as a serialized B+ Tree. Basically, a typical file can be represented by a set of records. For instance, an inode with its indirect blocks block map can be one record, dirent can be another record, name hash can be yet another record, and extended attributes in others, and so on. As may be known, a dirent is a directory entry storing the name of a corresponding file.

The MTrees supported by DDFS are essentially standalone filesystems in their own right inside a larger filesystem that encloses them. As many as 256 separate MTrees can exist in a given instance of DDFS. An MTree is a set of files in a self-contained file set and each MTree acts as a mount point. MTrees are represented internally as a B+ Tree with three intermediate levels.

In an embodiment, the granular migration process 115 performs operations on the MTree's underlying data structure, the B+ Tree. As stated above, a B+ Tree is a balanced tree of fixed depth, and each node in the tree is a fixed size 'page' of 64 KB or similar. Pages refer to each other through a page number, such as 0-8. The physical representation of the tree is a linear area of pages that gets written to disk. The fact that the B+ Tree in flattened form is essentially just a single linearly addressed segment of space means for certain operations it can be traversed quickly.

Figure 3:
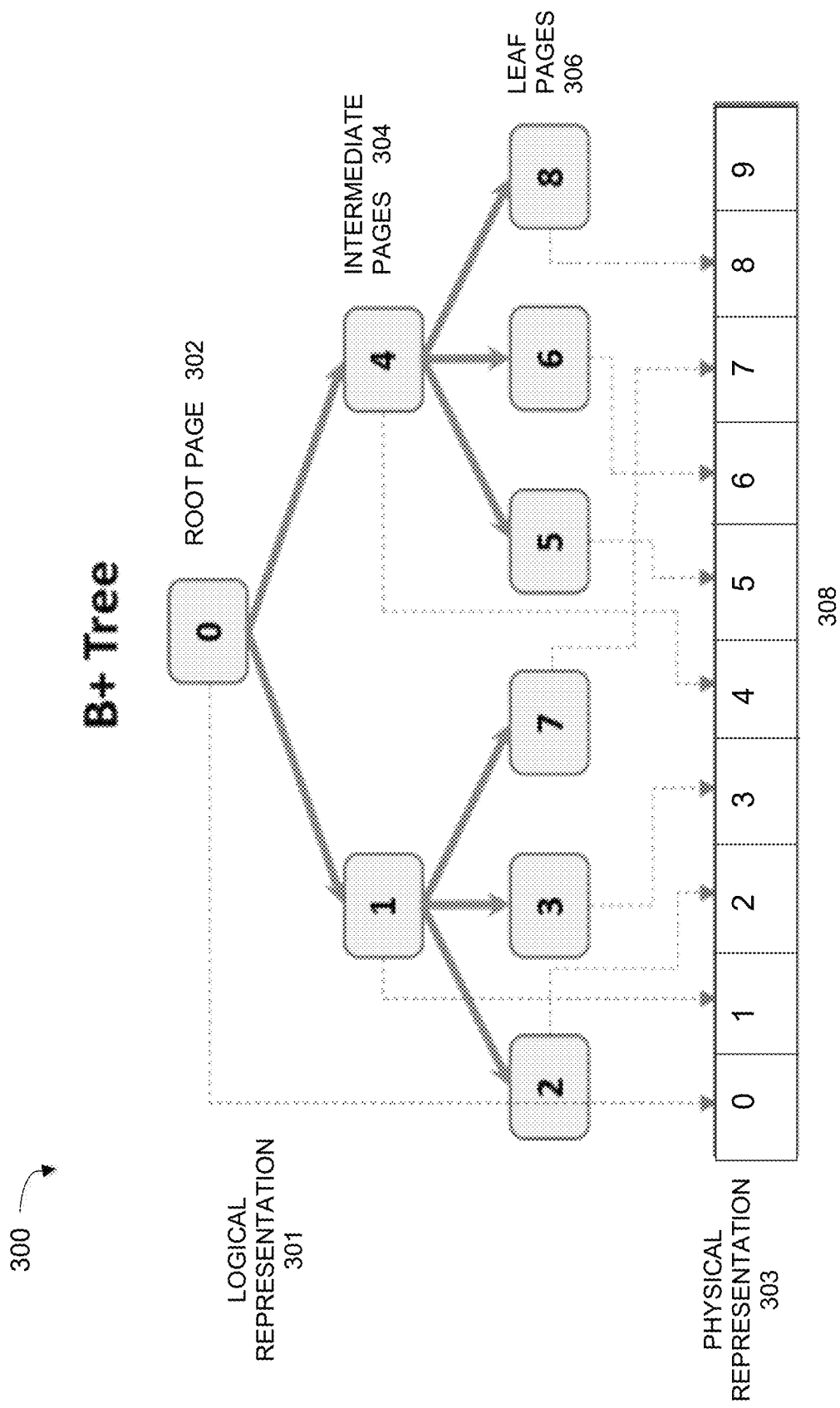
FIG. 3 illustrates an example B+ Tree showing a flattened on-disk layout, under some embodiments.

FIG. 3 illustrates an example B+ Tree showing a flattened on-disk layout, under some embodiments. For simplicity of illustration, the B+ Tree 300 of FIG. 3 is shown with only a single intermediate level, but it should be noted that more than one intermediate (e.g., three levels) are typically included. The example illustrated B+ Tree comprises a root page 302, one or more intermediate pages 304, and leaf pages 306 in a tree-shaped logical representation 301. The on-disk physical representation 303 comprises the nodes of each of these levels as a single one-dimensional array of numbers, 308.

The actual file metadata (i.e., the inode) is contained in the B+ Tree Leaf page 306. The leaf page itself contains key/value pairs as in a manner currently known. The 'key' is 32 bytes in size with the top 16 bytes or a 128-bit number kept in sorted order in the page. It is accompanied by a 'value,' which is actually just an index to data associated with that key, referred to as the 'payload.' The 128-bit key is composed of a 64-bit PID, or parent file ID, and 64-bit CID or child file ID, which is the inode number of the actual file. The B+ Tree then does not contain any file data, just key-value pairs.

The placement of the keys for a file is of particular relevance to the granular data migration process 115. The CHILD key contains inode type information including the tag, a DIRENT which contains the files name, and two hash keys. The CS_HASH key contains a hash of the file name in a case-sensitive way, and the CI_HASH contains a case-insensitive hash of the same. Given that the tag contained in the CHILD key, and it is encoded pid:cid (parent_ID: child_ID), it can only be involved in filtering the other pid:cid keys since they are nearby. Those keys which are in pid:hash format will be located elsewhere in the B+ Tree for a given file.

When a directory and its files are created in sequence, the keys for those entities line up sequentially in the MTree Leaf page. This means that the lookup proceeds expeditiously since all the data is already in memory.

Figure 4A:
FIG. 4A illustrates an example leaf page with four keys per file, under some embodiments.

FIG. 4A illustrates an example leaf page 400 with four keys per file, under some embodiments. For this example, MTree Leaf Page 5 has the file 'File_1' 402, which is located in directory 1 'Dir_1' and contains the four keys, as shown.

Figure 4B:
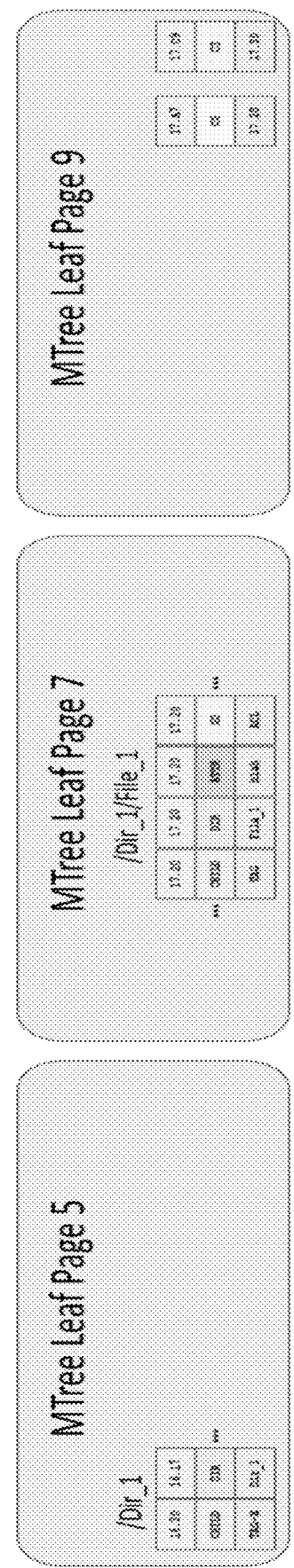
FIG. 4B illustrates an effect of the per-file keys of FIG. 4A spread among pages different due to fragmentation.

Over time, directories such as the example/Dir_1 can become fragmented due to file creations and deletion, and thus multiple pages will need to be loaded to lookup a single file. FIG. 4B illustrates an effect of the per-file keys of FIG. 4A spread among pages different due to fragmentation. As shown in FIG. 4B, the same set of keys 402 shown in FIG. 4A have been spread over three leaf pages (Leaf Page 5, Leaf Page 7, and Leaf Page 9) with non-sequential page numbers. To lookup a single file in the example of FIG. 4B, file '/Dir_1/File_1' 402 requires that a minimum of three pages need to be read into memory.

In an embodiment, a directory tagging process is used to address this fragmentation issue. For this embodiment, a special type of metadata, referred to as a 'tag' in conjunction with a tag filtering process is used to direct data to the proper location. When appropriate, more than one tag can be combined in a tag set. Thus, files with different tags can be selected for transfer, and defined as a tag set.

Embodiments can be used with a defined backup system file migration process, such as present in the Data Domain File System. By using snapshots, incoming new data (ingested file) is allowed to continue while the migration is in process and maintaining data consistency at the same time. This is achieved by performing operations on B+ Tree snapshots in conjunction with tag filtering on keys present in the leaf pages of these structures. This method is efficient became it makes a single pass walk of a B+ Tree in contrast with previous methods that look up files one-by-one via their pathname.

The tags are used to identify granular portions of files that need to be moved in the migration or replication process in certain MTree differencing ('diffing') processes that are used by the granular migration process 115. When migrating data, usually only the files which have changed since the last migration are then subject to migration, such as for an incremental backup. This is effectuated by taking a snapshot of the MTree (logical and physical representations) at each migration point and then comparing it with the snapshot taken at the previous migration point. A snapshot is a consistent, frozen-in-time logical copy of an MTree B+ Tree.

Tags are attached to files or similar data elements by defining and attaching or associating certain metadata to these files. Tags may be defined manually by the user or a client process, or assigned to a file or sub-directory level granule through an automated process. Typically, tagging is done by the. Backup client software (e.g., Networker) can apply tags to files when they are being created or modified. Other applications, such as load balancing processes can also do tagging.

Figures 5A, 5B:
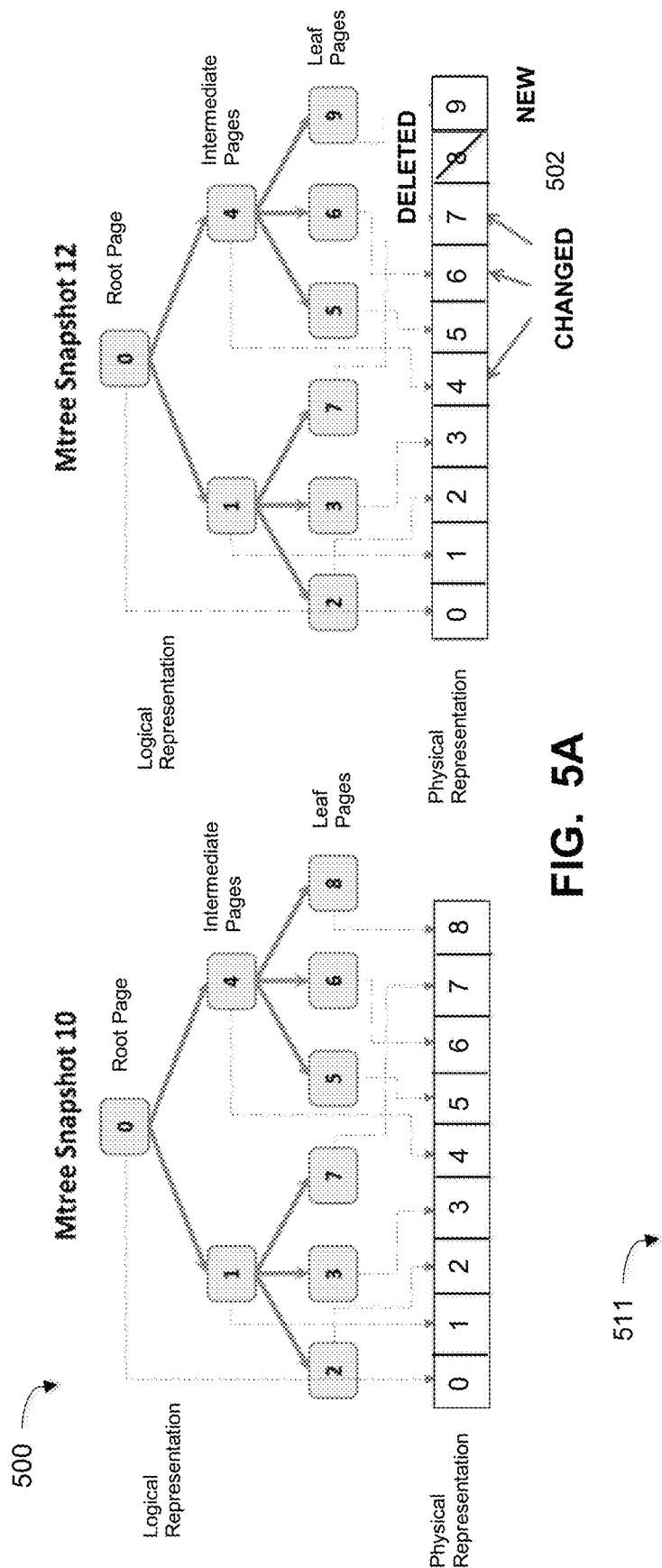
FIG. 5A illustrates an example of differencing (diffing) between two snapshots, under an example embodiment.
FIG. 5B illustrates a difference of two snapshots on a per-page basis.

FIGS. 5A and 5B illustrate an MTree differencing operation performed on two MTree snapshots. As shown in diagram 500 of FIG. 5A, an MTree Snapshot 10 is taken at a first moment in time showing the corresponding logical and physical representations of the MTree at that time, and MTree Snapshot 12 is taken at a second moment in time showing the corresponding logical and physical representations of the MTree at that time with certain changes, deletions, and additions 502 made to the MTree.

FIG. 5B illustrates the physical representations of the MTree Snapshots 10 and 12 with the differences shown as highlighted specific data entries 510. The entries of the snapshots 511 are annotated by an appropriate snapshot ID number (SID). When a file is created or modified, its leaf page where its keys reside is updated with the currently highest snapshot ID that has been issued. This is helpful when diffing two snapshots since pages that haven't been updated since before the oldest of the two snapshots has been modified between the time of the two snapshots being compared, and can be ignored.

In an embodiment, the detection of modified B+ Tree pages is done by using the snapshot ID (SID) as a hint to skip unmodified pages. Pages identified as modified are then checked key-by-key for changes. For keys that are identical in value and are of type CHILD, they represent the inode of the actual file and source and destination values for that field must be compared. The resulting differenced MTree snapshots then consist of a list of changed keys and payloads, which are transmitted for the migration. For each particular key/value pair that is being replicated, three possibilities result: CREATE. UPDATE, or REMOVE. The example 511 of FIG. 5B illustrates a difference of two snapshots on a per-page basis.

With respect to the tagging process, a 'tag' is a closed, defined metadata element, and is generally represented as a 32-bit integer that is assigned by a backup client application to a file for its own purposes; a 'tagged file' is a file that has a tag attached to it, where the attachment is created by storing the 32-bit tag in the payload of the child key; and a 'tag set' is a list of one or more tags. The 'key' in this context is a BTree Leaf page key that has two parts: a lookup key (Lkey) that is two 64-bit file IDs (for a total of 128 bits), and a full key (Fkey) that includes the Lkey and also a type and hash. Other elements such as size, offset and checksum may also be included, but are not keyed on. The full key, offset and size identifies the place and size in the leaf page where the 'payload' resides. The payload can contain the name of a file (in the case of a DIRENT type), or meta information (in the case of a CHILD type).

In an embodiment, the Directory Manager that differences B+ Trees on behalf of the MTree migration process 115 is extended to take a list of tags of files to be sent during the migration process. Currently a linear list is used, but this can be sped up using a hash or bloom filter to check if a file's tag in in the set of tags for which such tagged files are to be replicated.

FIG. 6 is a table 600 that illustrates an example of a list of tags and associated properties used in a granular migration process, under some embodiments. The table of FIG. 6 is a list of keys showing which keys contain a tag or require some special action to be performed based on its tags. As shown in FIG. 6, the key types have certain values and tagging implications. The 'Migrate' column indicates whether or not the tagged data needs to be moved or not. Those keys having a 'no' entry in the Replicate column can be simply ignored or skipped. This table thus illustrates how certain efficiencies are realized by the described embodiments. That is, a number of keys can be initially ignored, and they can be recreated on the destination end providing both decreased processing time and simplification of the process software code.

The tags of table 600, and any other possible tags, may be embodied in a tag set structure comprising a list of file tags and a list length. As shown in FIGS. 5A and 5B, snapshots are taken of MTrees at different points in time. For each snapshot, a Granular Migration (GMIG) related data structure is maintained with that snapshot in a higher level tree structure called an Umbrella Tree or 'Utree.' It contains among other things the tag set used for the completed file migration. For this, a GMIG Utree attribute is used. A Transfer checksum is also maintained that is composed of the keys and their payload sent from the source to the destination system.

A UTree or 'umbrella tree' is a higher level tree in the B+ Tree hierarchy. In a typical system, the meta and data nodes can utilize individual B+ Trees to respectively hold the metadata and data files. Alternatively, other or higher level tree structures may be used to hierarchically organize this information. Thus, as with individual B+ Trees of name space or data space that store content handles etc., there can be a next higher-level B+ Tree structure that can be constructed to house content handles of name space and data space B+ Trees themselves. A Utree is generally a B+ Tree that holds pointers to MTrees and MTree snapshots, along with other possible data elements.

When a snapshot (local snapshot) is taken, it will be initiated from the meta node of the given MTree. Thus, meta node acts as a cluster coordinator for the MTree, and the meta node could then generate a MTree unique identifier for use as a cluster-wide snapshot identity. The process of taking the cluster snapshot can then forward that identifier to all the nodes that house the data space B+ Trees of the MTree. Thus, each node can then store the point in time copy of data space B+ Tree into its local parent UTree. Since the snapshot backup is just a frozen view of a file set, in the distributed name space, it is simply a collection of such point in time copies of set of name space and data space B+ Trees. So, for a given snapshot, there will be a correlated set of a one name space B+ Tree and a set of the corresponding data space B+ Trees, knit together by the snapshot identifier. In general, snapshot backups are taken at regular periodic time intervals by the backup server 102. These snapshots are identified by a monotonically increasing numerical value, each of which corresponds to a specific correlated B+ Tree.

The granular file migration process 115 moves data in appropriate size sets (granules) of data. In an embodiment, an initial granule of granular migration is the subdirectory. Such a sub-directory level can be at the individual file level for file-by-file migration or any other sub-sub-directory granular level.

In an embodiment, the system 100 of FIG. 1 performs symmetric migration of data, which is migration in which the source and destination MTree names and directory structures are identical.

FIGS. 7A and 7B illustrate symmetric migration of data at the sub-directory level in an example embodiment. As shown in FIG. 7A, a source node 702, such as a DataDomain device denoted 'DDR1' stores an MTree, 'mtree1' that has an upper level directory/dir1 and two subdirectories '/dir11' and '/dir12'. The subdirectory/dir12 is intended to be moved in migration operation 706 to a destination Data Domain device 704, denoted 'DDR2'. As part of the granular migration process, the files or further subdirectories of subdirectory to be moved (/dir12) are tagged with the appropriate tag, such as 'Tag T2' as shown.

For symmetric Migration, The dir1/dir12 of mtree1 is migrated to the same mtree1 with the same dir1/dir12, thus the mtree1/dir1 structure exists in DDR2, as shown in FIG. 7A. FIG. 7B illustrates the composition of mtree1 in the source and destination DDR devices after the migration 706. In this case, the directory/dir12 and its tagged files are moved to the destination DDR2, and deleted from the source 702 DDR1. The symmetric migration operation 706 imposes certain starting and ending conditions, including: the moved data (e.g., /dir12) must not exist on the source after movement to the destination, the migration is a normal data migration operation and all the names are the same before and after the migration, and the non-moved data is preserved as pre-existing content in the source (e.g., /dir1 in DDR1), as shown in FIG. 7B.

In an embodiment, file tag filtering assigns and moves files based on their tags, such as among the tags illustrated in FIG. 6. This process requires an MTree walk operation followed by a filtering operation based on the tags. The data is then sent from source to destination based on sending the keys corresponding to these tags. As shown in Table 600 of FIG. 6, certain tags are labeled as 'No Migration' so that some keys get sent, while others are not. In this case, an unset key is recreated from the information sent over so it does not need to be sent, thus helping realize some of the efficiencies of the process.

A general method of performing granular migration of data at a sub-directory (file) level essentially involves the following main steps:
(1) Tag files to be migrated within the MTree of the source.
(2) Take a first snapshot to gather all changes to a current time to an active MTree of the files including files to be transferred.
(3) Migrate the MTree from the source to the destination and write-lock the active MTree.
(4) Take a second snapshot of the MTree to capture any changes that occurred while the first snapshot and migration through an MTree differencing operation.
(5) Delete migrated files from the active MTree in the source and release the write lock.

Figure 8A:
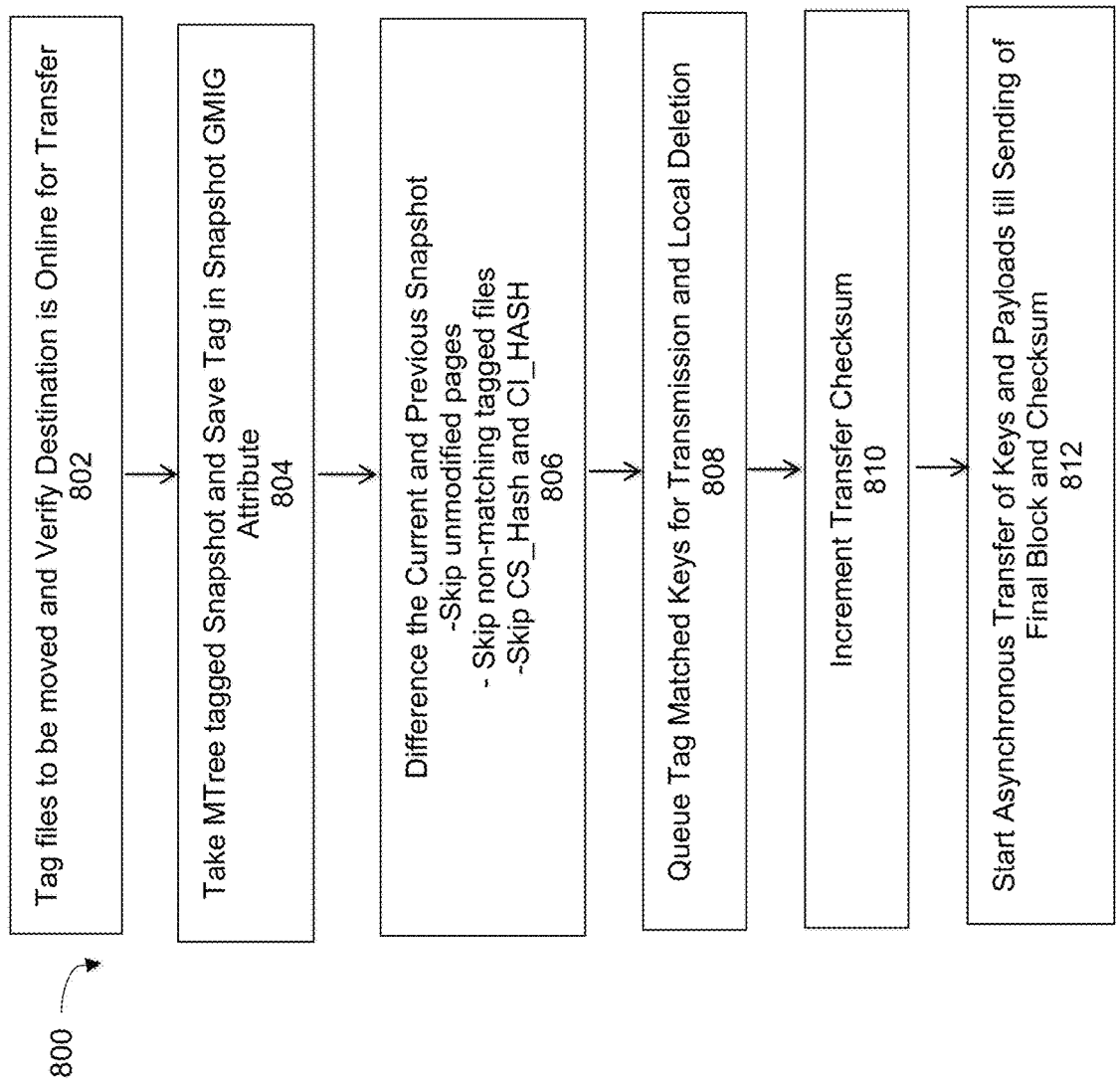
FIG. 8A is a flowchart illustrating a first portion of a method of moving data between a source and destination using granular migration, under some embodiments
Figure 8C:
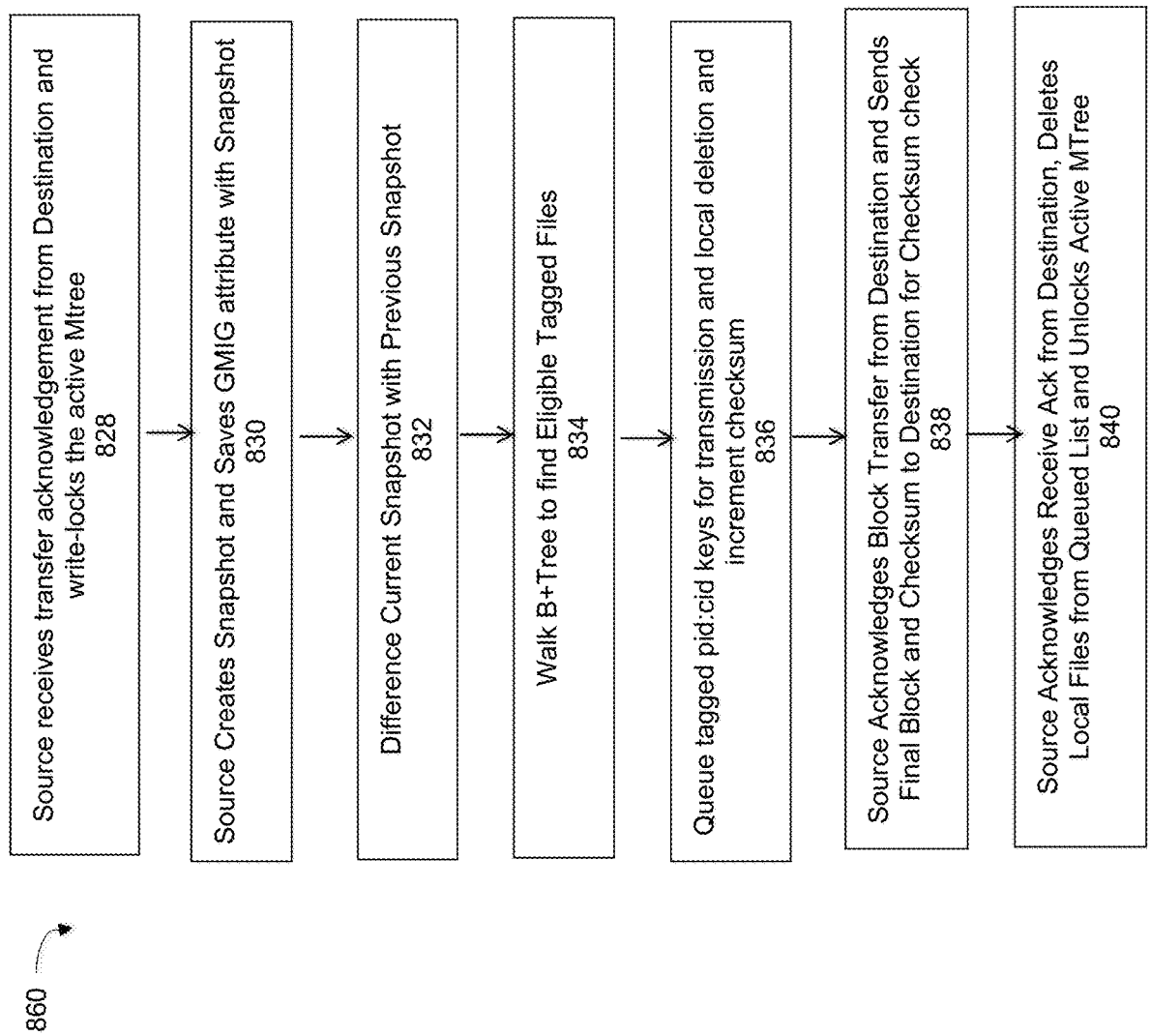
FIG. 8C is a flowchart illustrating a subsequent portion of the method of FIG. 8B.

FIGS. 8A to 8C illustrate the above processing steps in greater detail. FIG. 8A is a flowchart illustrating a first portion of a method of moving data between a source and destination using granular migration, under some embodiments, FIG. 8B is a flowchart illustrating a subsequent portion of the method of FIG. 8A, and FIG. 8C is a flowchart illustrating a subsequent portion of the method of FIG. 8B. For the flowchart of FIGS. 8A to 8C, several steps are performed sequentially or simultaneously by the source and the destination. Most processing steps are described from the point of view of the source with concurrent or consequential actions mentioned for the destination.

Process 800 begins with the tagging of files to be moved, and verifying by the source that the destination is online and ready for the data transfer, 802. For this step, the source sends a check transfer status to the destination, and the destination responds by sending back an acknowledge ready to transfer message to the source. The source then takes an MTree tagged snapshot, and saves the tag as a snapshot GMIG attribute. Recording a tag or tag set with each snapshot makes it a 'tagged snapshot.'

In step 806, the process differences the current snapshot and previous snapshot. For this, it skips unmodified pages, non-matching tagged files, CS_HASH and CI_HASH. The snapshot differencing operation which diffs snapshots can difference non-identical tag sets on each snapshot. Normally this will be a 'right join' for a given tag. That is, the tags that are in the newer snapshot (right) rule over the tags that are in the older (left) snapshot. For a file to be transferred, it must be tagged in the right, and it will be sent regardless if not tagged, or present in the left, or if it is tagged in the left but has changed in content between the first and second snapshot.

The process then queues tag matched pid:cid keys for transmission and local (source) deletion, 808. It should be noted that there are typically multiple keys that use the pid:cid format of lookup key (vs pid:hash) and they are all moved together if there is a tag match, but only CHILD and CHILD_INDIRECT keys contain the tag, and a DIRENT or SD key (which is pid:cid) might come first. The process must gather these keys up (there are in sequence, just out of order by type) to see if a CHILD/CHILD_INDIRECT key is present and has a matching tag, and then it sends them all to the destination. After the tag matched keys are queued in 808, the process increments the transfer checksum, 810. The source then starts the asynchronous transfer of keys and payloads until it sends the final block and checksum, 812. A queue for transmission generally means that keys are sent over in chunks, asynchronously and in parallel with the B+ Tree tag-filtered walk.

After the source starts the and for this step, the destination performs certain processing steps, as shown in FIG. 8B. As shown in process 850 of FIG. 8B, the destination receives the queued blocks of pid:cid keys, 814. It then installs the pid:cid keys, 816, and uses DIRENT to make CS/CI HASH keys, 818. The destination increments the receive checksum, and acknowledges the block transfer, 820. This triggers the source to send the final block and checksum, 822. The destination receives this final block and checksum from the source and calculates the checksum, 824, to verify that the checksums match. The destination verifies the source and destination checksums from its calculation and sends a transfer acknowledgement, 826.

FIG. 8C illustrates some of the processing steps performed by the source after receiving the transfer acknowledgement sent by the destination in step 826. Thus, in process 860, the source receives the transfer acknowledgement and write-locks the active MTree, 828. The source then write-locks the active MTree, 830. The source creates a snapshot and saves the GMIG attribute with the snapshot, 830. It then differences this snapshot with a previous snapshot 832. The source walks the B+ Tree to find eligible tagged files, 834. It queues tagged pid:cid keys for transmission and local (source) deletion, and increments the checksum, 836, where the queueing means that keys are sent in asynchronously in chunks and in parallel with the B+ Tree tag-filtered walk.

After the queued tagged pid:cid keys are transmitted from the source to the destination, the destination acknowledges the block transfer, which acknowledgement is then received by the source, which then acknowledges and sends the final block and checksum, 838. The destination acknowledges receipt of the final block and calculates the checksums for verification back to the source. The source receives this acknowledgement from the destination, deletes local files from the queued list, and lifts the write-lock from the active MTree, 840.

Figure 9:
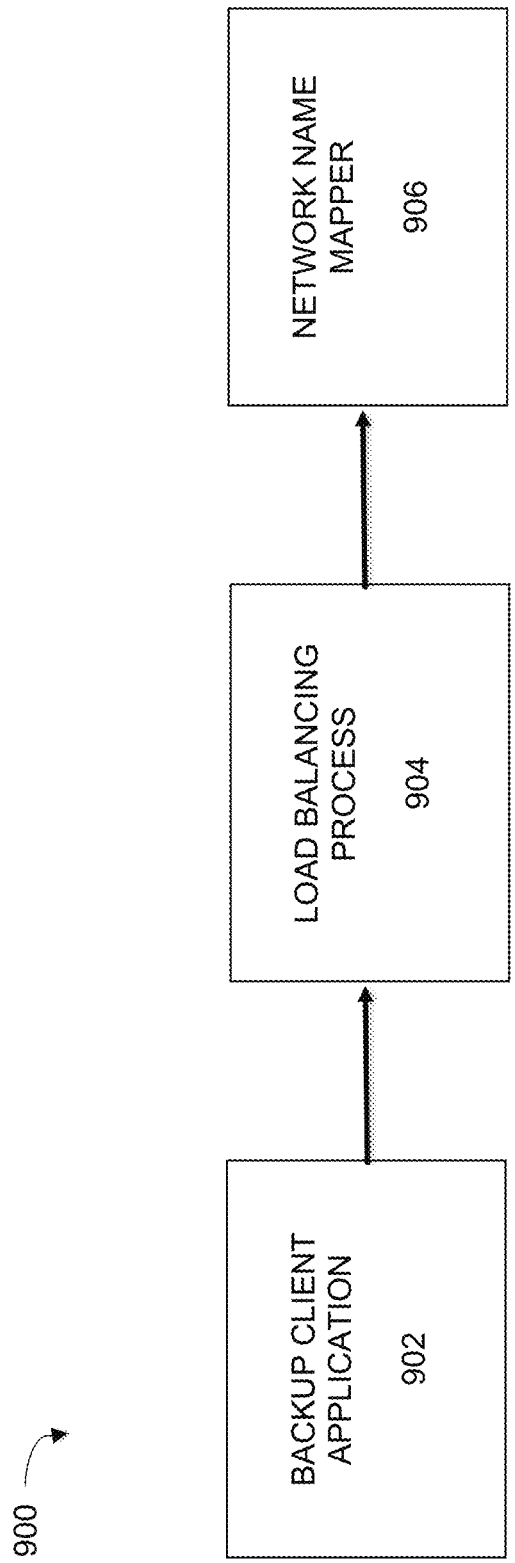
FIG. 9 is a block diagram illustrating a load balancing system that implements a granular migration process, under some embodiments.

The granular migration process described herein can be used for various different applications. It is particularly well-suited for load balancing operations. FIG. 9 is a block diagram illustrating a load balancing system that implements a granular migration process, under some embodiments. As shown in FIG. 9, system 900 includes a backup client application (BCA) 902. Third parties, as well as other in-house divisions typically offer software products that run on a client, such as a user's laptop/desktop/tablet or similar computer, as well as Web, application, and database servers. These applications determine what user files should be copied and sent to a backup server (such as the Data Domain Restorer (DDR)).

The backup client application 902 interfaces with load balancing process 904. This process determines where one backup client's data should be stored on which Data Domain Restorer (DDR) device. Analytics might be used to find the best location to move this data, and that may in turn be content-based, i.e., where similar data is already stored and can therefore be compressed via de-duplication. The network name mapper (NMN) 906 serves as a repository or database that tracks the location of backup resources such as DDRs, MTrees, and MTree subdirectories. This can be used to allow namespace redirection at the subdirectory level, e.g., as shown in FIG. 7A.

In one example embodiment, the local backup client 902 detects a need to transfer data from one DDR to another DDR for better compression and/or resource utilization. The local backup client then determines the source DDR:Mtree: Subdirectory to be moved and the destination DDR:Mtree: Subdirectory. The local backup client tags the desired files on the source DDR and then moves that set of files to the destination DDR. The network name mapper 906 is then updated with the new location of the data. The backup client application 902 is then updated by the network name mapper of the moved location of the new source DDR:Mtree: Subdirectory so that subsequent backups of those affected clients transfer data to the new location. This example is but one example use of the granular migration process, and many other similar applications are also possible.

System Implementation

Figure 10:
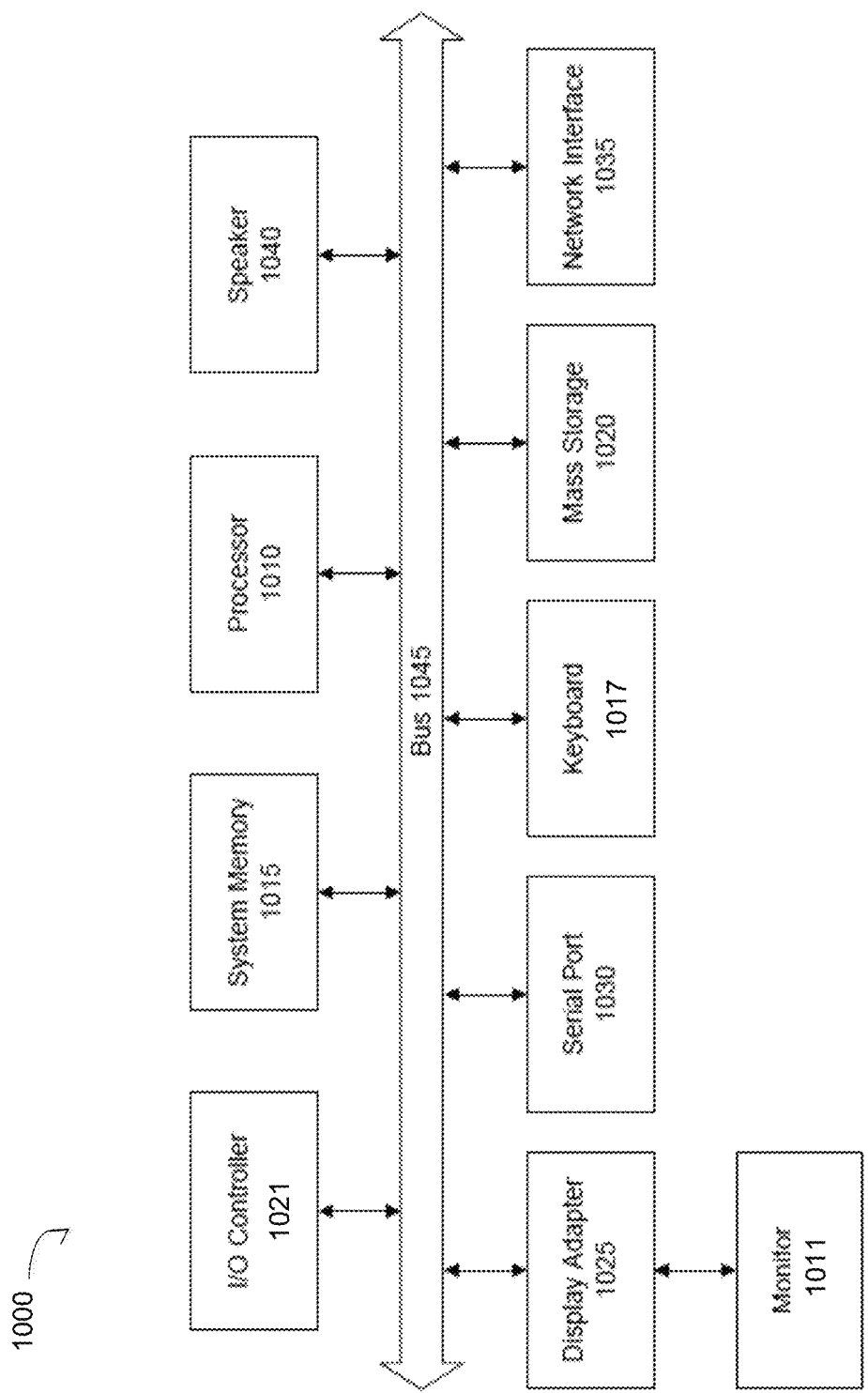
FIG. 10 is a block diagram of a computer system used to execute one or more software components of a granular migration process, under some embodiments.

FIG. 10 is a block diagram of a computer system used to execute one or more software components of providing granular data migration, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 10 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing granular migration of data between a source and a destination in a network, comprising:
   tagging files to be migrated within an MTree of the source by attaching a tag comprising a metadata element to a respective file to create a tagged file;
   storing the tag as a 32-bit tag in a payload of a child key of a key/value pair, wherein the child key is tagged as a 'migrate' or 'no migrate' file;
   taking a first snapshot to gather all changes to a current time to an active MTree of the files including files to be transferred;
   migrating only files tagged as 'migrate' in the MTree from the source to the destination;

write-locking the active MTree on the source;
taking a second snapshot of the MTree;
performing an MTree differencing operation to capture any changes that occurred while taking the first snapshot and migrating the MTree;
maintaining the tag along with other tags in a tag set comprising a list of file tags and a list length;
generating, for each of the first and second snapshot, a granular migration (GMIG) data structure in a umbrella tree (Utree) having a higher level tree structure than the MTree and containing the tag set used in migrating the MTree;
deleting the migrated files from the active MTree in the source; and
releasing the write lock from the active MTree on the source.

2. The method of claim 1 wherein each of the first snapshot and the second snapshot are consistent, frozen-in-time logical copy of an MTree B+ Tree, and wherein the Utree contains pointers to the MTree and the first snapshot and second snapshot.

3. The method of claim 1 further comprising:
using a GMIG Utree attribute for the tag set for a completed migration; and
maintaining a transfer checksum comprising the keys and associated payload sent in the migrated files, wherein the migrating moves the migrated files at a certain granularity with respect to dataset size.

4. The method of claim 3 further comprising performing a tag filtering process to move files within the network based on their tags using an MTree walk operation to identify the tags.

5. The method of claim 1 wherein only files tagged as 'migrate' are moved from the source to the destination the migration is a symmetric migration in which identical directory structures are used in both the source and the destination.

6. The method of claim 1 wherein the tag is applied by a data backup program executed in the network to files as they are created or modified.

7. The method of claim 6 wherein the tag identifies only those sub-directory granular portions of files that need to be moved in the migrating step as identified by the MTree differencing operation, such that only the files which have changed since a last migration are moved, and wherein the granularity is on the level of sub-directory or sub-sub-directory level.

8. A method migrating data from a source to a destination in a network, comprising
assigning a tag to each file in a directory based repository of the source, the tag indicating whether or not each corresponding file is to be migrated or not migrated, the repository organized as an MTree structure, wherein the tag is applied by a data backup program executed in the network to files as they are created or modified and identifies only those sub-directory granular portions of files that need to be moved in the migrating as identified by an MTree differencing operation, such that only the files which have changed since a last migration are moved;
attaching the tag to a respective file to create a tagged file as a payload of a child key of a key value pair;
walking the MTree to identify the tags;
performing a tag filtering process on the identified tags to direct the file data to a proper location of the destination for files tagged to be migrated;
taking a series of snapshots of the MTree to allow processing of the file data to continue while any migration is in process to maintain data consistency in the network;
maintaining the tag along with other tags in a tag set comprising a list of file tags and a list length; and
generating, for each snapshot of the series of snapshots, a granular migration (GMIG) data structure in a umbrella tree (Utree) having a higher level tree structure than the MTree and containing the tag set used in migrating the files.

9. The method of claim 8 wherein the tag having a format of parent_ID:child_ID, and further wherein the Utree contains pointers to the MTree and each snapshot, the method further comprising:
using a GMIG Utree attribute for the tag set for a completed migration; and
maintaining a transfer checksum comprising the keys and associated payload sent in the migrated files, wherein the migrating moves the migrated files at a certain granularity with respect to dataset size.

10. The method of claim 8 wherein each snapshot of the series of snapshots are consistent, frozen-in-time logical copy of an MTree B+ Tree of the source, and further wherein the migration is a symmetric migration in which identical directory structures are used in both the source and the destination.

11. A system migrating data from a source to a destination in a network, comprising
a repository of the source storing data organized in a hierarchy comprising directories and sub-directories including individual files;
a hardware-based granular migration processing component assigning a tag to each file in a directory, the tag indicating whether or not each corresponding file is to be migrated or not migrated, and walking the MTree to identify the tags, wherein the tag is applied by a data backup program executed in the network to files as they are created or modified, and wherein the tag identifies only those sub-directory granular portions of files that need to be moved in the migrating as identified by an MTree differencing operation, such that only the files which have changed since a last migration are moved, and further wherein the tag comprises a metadata element attached to a respective file to create a tagged file as a payload of a child key of a key/value pair comprising a parent_ID:child_ID;
a tag filtering processing component performing a tag filtering process on the identified tags to direct the file data to a proper location of the destination for files tagged to be migrated; and
a backup processing component taking a series of snapshots of the MTree to allow processing of the file data to continue while any migration is in process to maintain data consistency in the network, and maintaining the tag along with other tags in a tag set comprising a list of file tags and a list length, and further generating, for each snapshot of the series of snapshots, a granular migration (GMIG) data structure in a umbrella tree (Utree) having a higher level tree structure than the MTree and containing the tag set used in migrating the files.

12. The system of claim 11 wherein each snapshot of the series of snapshots are consistent, frozen-in-time logical copy of an MTree B+ Tree of the source, and further wherein the Utree contains pointers to the MTree and each snapshot, and further wherein a GMIG Utree attribute is used for the tag set for a completed migration, and a transfer checksum is maintained comprising the keys and associated payload sent in the migrated files, wherein the migrating moves the migrated files at a certain granularity with respect to dataset size.

\* \* \* \* \*